US005719496A

United States Patent [19]
Wolf

[11] Patent Number: 5,719,496
[45] Date of Patent: Feb. 17, 1998

[54] DUAL-ELEMENT PROXIMITY SENSOR FOR SENSING THE DIRECTION OF ROTATION OF A FERROUS TARGET WHEEL

[75] Inventor: Ronald J. Wolf, Elkhart, Ind.

[73] Assignee: Durakool Incorporated, Elkhart, Ind.

[21] Appl. No.: 485,561

[22] Filed: Jun. 7, 1995

[51] Int. Cl.$^6$ .................. G01P 3/52; G01P 13/00; G01B 7/14; H01L 43/06
[52] U.S. Cl. .................. 324/165; 324/174; 324/207.2; 324/207.25
[58] Field of Search .................. 324/173, 174, 324/165, 207.2, 207.5, 207.22, 207.24, 207.21

[56] References Cited

U.S. PATENT DOCUMENTS

| | | | |
|---|---|---|---|
| 4,370,614 | 1/1983 | Kawada et al. | 324/165 |
| 4,970,463 | 11/1990 | Wolf et al. | 324/207.2 |
| 5,444,370 | 8/1995 | Wu | 324/207.2 |

Primary Examiner—Walter E. Snow
Attorney, Agent, or Firm—Fitch, Even, Tabin & Flannery

[57] ABSTRACT

A proximity sensor which includes a bar magnet having opposing North and South poles and two magnetic responsive sensors disposed on a lateral face of the magnet between the opposing North and South poles and a pair of corresponding flux concentrators, configured such that the magnetic responsive sensors are sandwiched between the magnet and the flux concentrators along a lateral face of the magnet between opposing pole faces forming a dual-element sensor assembly. In one embodiment the dual-element sensor assembly is adapted to be utilized with a two-channel ferrous target, a target wheel having ferrous targets that are axially separated to correspond to the two-channel sensor assembly. In this embodiment the sensors are configured such that the longitudinal axis of the sensor is generally parallel to the axis of rotation of the ferrous target wheel. In order to provide the directional information, the targets on each channel are also angularly separated on the ferrous target wheel to provide a unique logic sequence for each direction of rotation. In an alternate embodiment the dual element sensor assembly is utilized with a single channel target wheel with the sensors aligned such that the longitudinal axis of the sensor assembly is generally perpendicular to the axis of rotation of the ferrous target such that the sensors are sequentially disposed to a single channel target as the target wheel rotates. Similar to the other embodiment, the alternative embodiment is also able to provide a unique logic sequence depending on the direction of rotation of the ferrous target wheel. Thus, the sensor in accordance with the present invention is not only able to sense the proximity of a ferrous target, but also the direction of rotation of the ferrous target wheel.

35 Claims, 5 Drawing Sheets

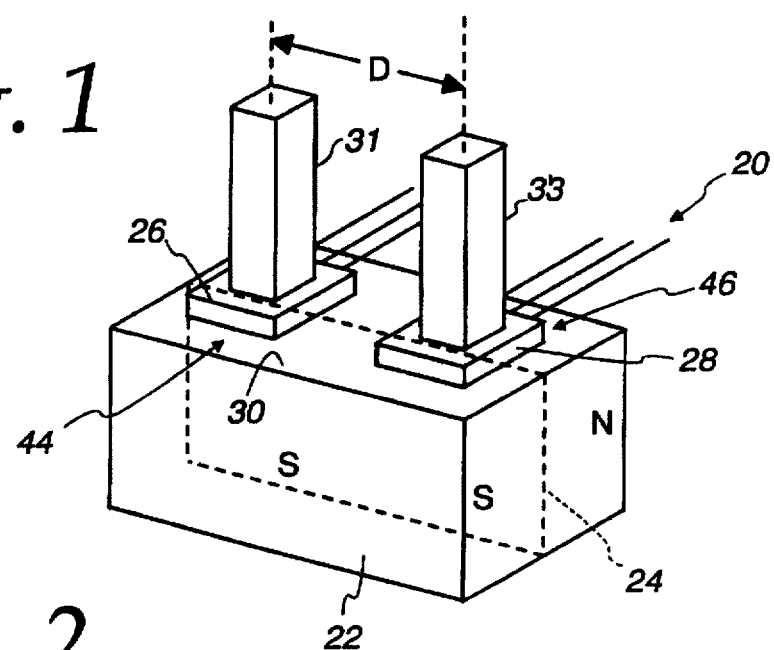
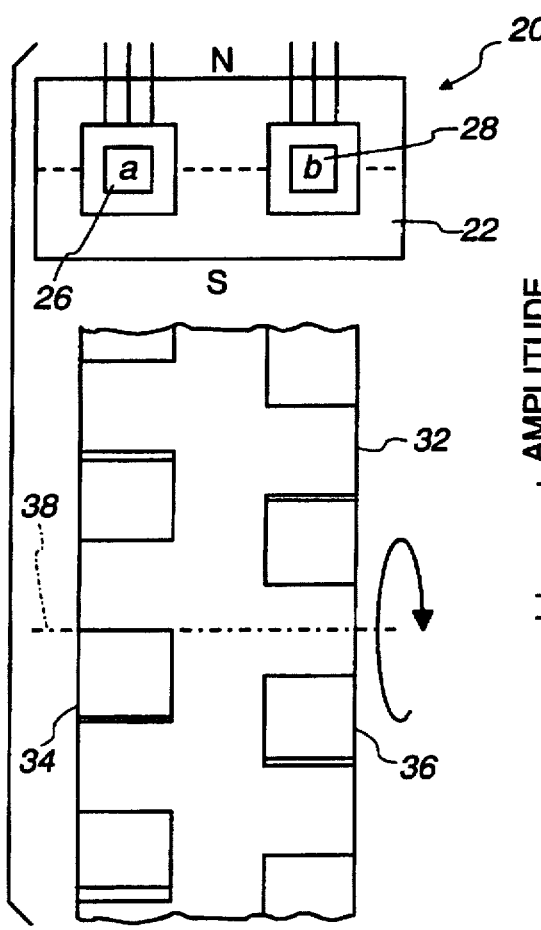
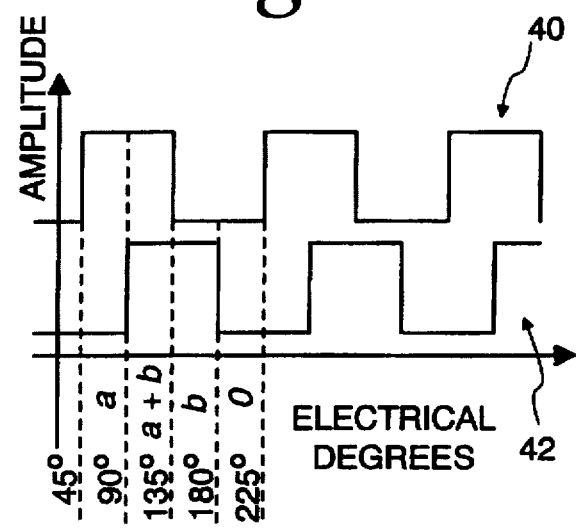

ROTATION

DUAL-ELEMENT PROXIMITY SENSOR FOR SENSING THE DIRECTION OF ROTATION OF A FERROUS TARGET WHEEL

BACKGROUND OF THE INVENTION

1. Field of the Invention

The present invention relates to a proximity sensor for sensing ferrous targets, for example, a tooth or a notch on a ferrous target wheel or vein, immediately upon power-up and more particularly to a proximity sensor which not only senses the proximity of a ferrous target but is also able to detect the direction of rotation of the target which includes a bar magnet having opposing North and South poles, two magnetic flux responsive sensors disposed on a lateral face between the opposing poles and one or more flux concentrators attached to the magnetic flux responsive sensors.

2. Description of the Prior Art

Proximity sensors suitable for sensing ferrous targets, such as a tooth or notch on a ferrous target wheel, are generally known in the art. An example of such a sensor is disclosed in U.S. Pat. No. 4,970,463, assigned to the same assignee as the present invention and hereby incorporated by reference. Such a sensor includes a magnet, a magnetic flux responsive sensor, such as a Hall effect element, and a flux concentrator. The magnetic flux responsive element is sandwiched between the magnet and the flux concentrator along a lateral face of the magnet between opposing pole faces. As discussed in the '463 patent, the configuration of the sensor disclosed therein provides for a relatively stable electrical output signal over a relatively wide temperature range.

In one known application, the sensor is disposed at a fixed air gap with respect to a ferrous target wheel to detect the presence of a tooth or notch on the wheel in an ignition timing system for an automobile. In such an application, it is necessary for the sensor to provide a signal representative of the proximity of the tooth or notch on the ferrous target wheel while it is stationary upon power-up.

While such sensors as disclosed in the '463 patent provide a good indication of the proximity of a tooth or notch on a ferrous target wheel, such sensors are not able to provide an indication of the direction of rotation of the ferrous target wheel. In some applications, such as an automotive transmission application, the direction of rotation is necessary information. As such, the sensor as disclosed in the '463 patent would not be sufficient for such an application.

SUMMARY

It is an object of the present invention to solve various problems in the prior art.

It is yet another object of the present invention to provide a sensor that is adapted to indicate the proximity of a ferrous target at zero speed upon power-up.

It is yet another object of the present invention to provide a proximity sensor that is adapted to indicate the direction of rotation of a ferrous target wheel.

Briefly, the present invention relates to a proximity sensor which includes a bar magnet having opposing North and South poles and two magnetic responsive sensors disposed on a lateral face of the magnet between the opposing North and South poles and a pair of corresponding flux concentrators, configured such that the magnetic responsive sensors are sandwiched between the magnet and the flux concentrators along a lateral face of the magnet between opposing pole faces forming a dual-element sensor assembly. In one embodiment the dual-element sensor assembly is adapted to be utilized with a two-channel ferrous target, a target wheel having ferrous targets that are axially separated to correspond to the two-channel sensor assembly. In this embodiment the sensors are configured such that the longitudinal axis of the sensor is generally parallel to the axis of rotation of the ferrous target wheel. In order to provide the directional information, the targets on each channel are also angularly separated on the ferrous target wheel to provide a unique logic sequence for each direction of rotation. In an alternate embodiment, the dual element sensor assembly is utilized with a single channel target wheel with the sensors aligned such that the longitudinal axis of the sensor assembly is generally perpendicular to the axis of rotation of the ferrous target wheel such that the sensors are sequentially disposed to a single channel target as the target wheel rotates. Similar to the other embodiment, the alternative embodiment is also able to provide a unique logic sequence depending on the direction of rotation of the ferrous target wheel. Thus, the sensor in accordance with the present invention is not only able to sense the proximity of a ferrous target, but also the direction of rotation of the ferrous target wheel.

BRIEF DESCRIPTION OF THE DRAWING

These and other objects of the present invention will be readily understood with reference to the following specification and attached drawings, wherein:

FIG. 1 is a perspective view of a dual-element sensor assembly in accordance with the present invention;

FIG. 2 is a plan view of the dual-element sensor assembly illustrated in FIG. 1, shown disposed adjacent to a two-channel ferrous target wheel;

FIG. 3 are graphs of the amplitude of the output signals from the magnetic responsive sensors on the dual-element sensor assembly as a function of the angular position of the ferrous target wheel relative to the sensor assembly;

DETAILED DESCRIPTION OF THE INVENTION

Figure 4:
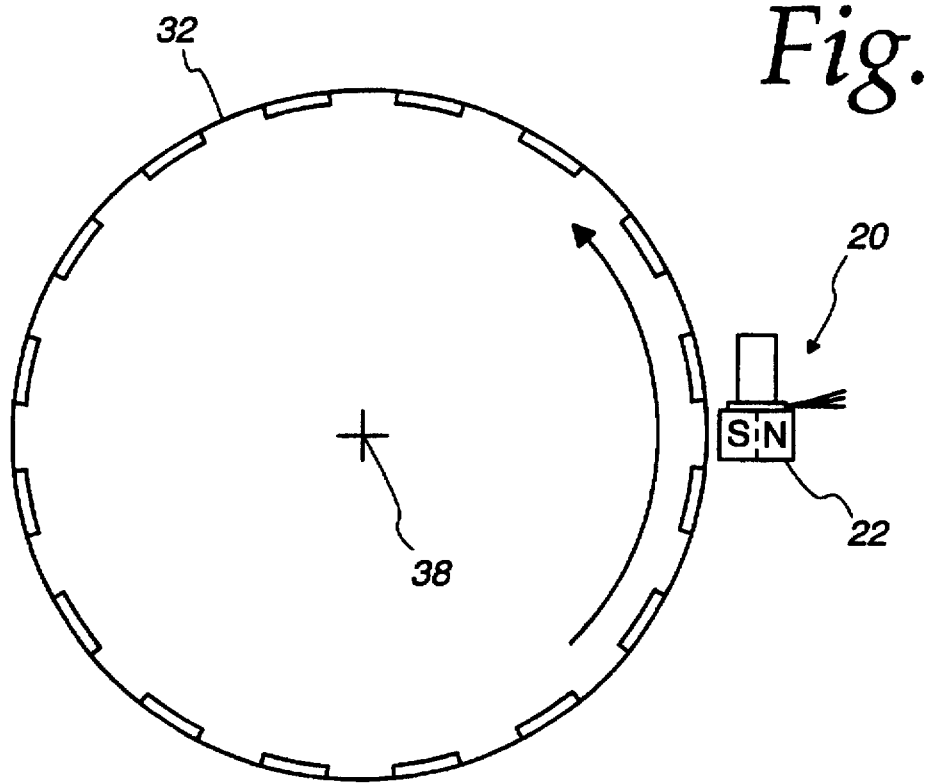
FIG. 4 is a side elevational view of the dual-element sensor assembly and two-channel target wheel illustrated in FIG. 2.

The dual-element sensor assembly in accordance with the present invention, generally identified with the reference numeral 20, is illustrated in FIG. 1. As illustrated, dual-element sensor assembly 20 includes a bar magnet 22 having opposing North and South magnetic poles defining a magnetic neutral plane, identified by the dash line 24, which separates the North and South poles. The sensor assembly 20 also includes a pair of magnetic flux responsive elements 26 and 28, disposed along a lateral face 30 between the North and South poles. In order to enhance the signal output level, a corresponding pair of flux concentrators 31 and 33 may be secured to the magnetic flux responsive elements 26 and 28, respectively, defining A and B channels of the sensor assembly 20, respectively. As discussed in U.S. Pat. No. 4,970,463, herein incorporated by reference, the sensor assembly 20 is also able to detect ferrous targets that are at rest with respect to the sensor assembly 20.

Figure 5:
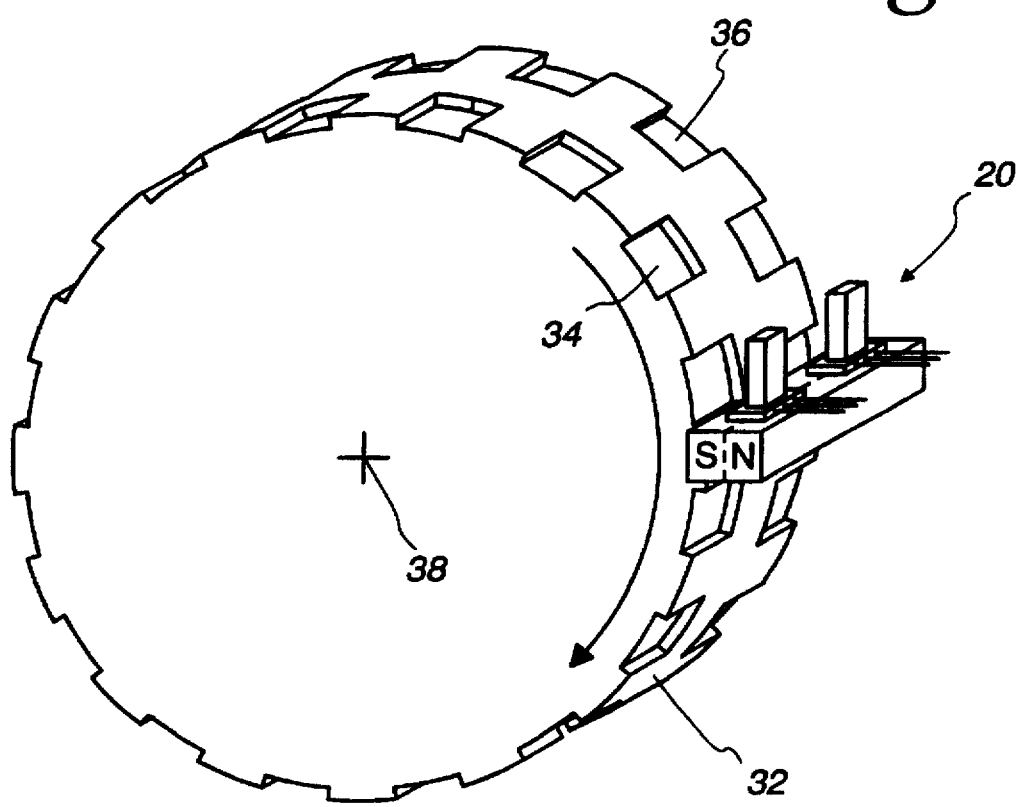
FIG. 5 is similar to FIG. 4, but illustrating the dual-element sensor assembly and two-channel target wheel in perspective.
Figure 10:
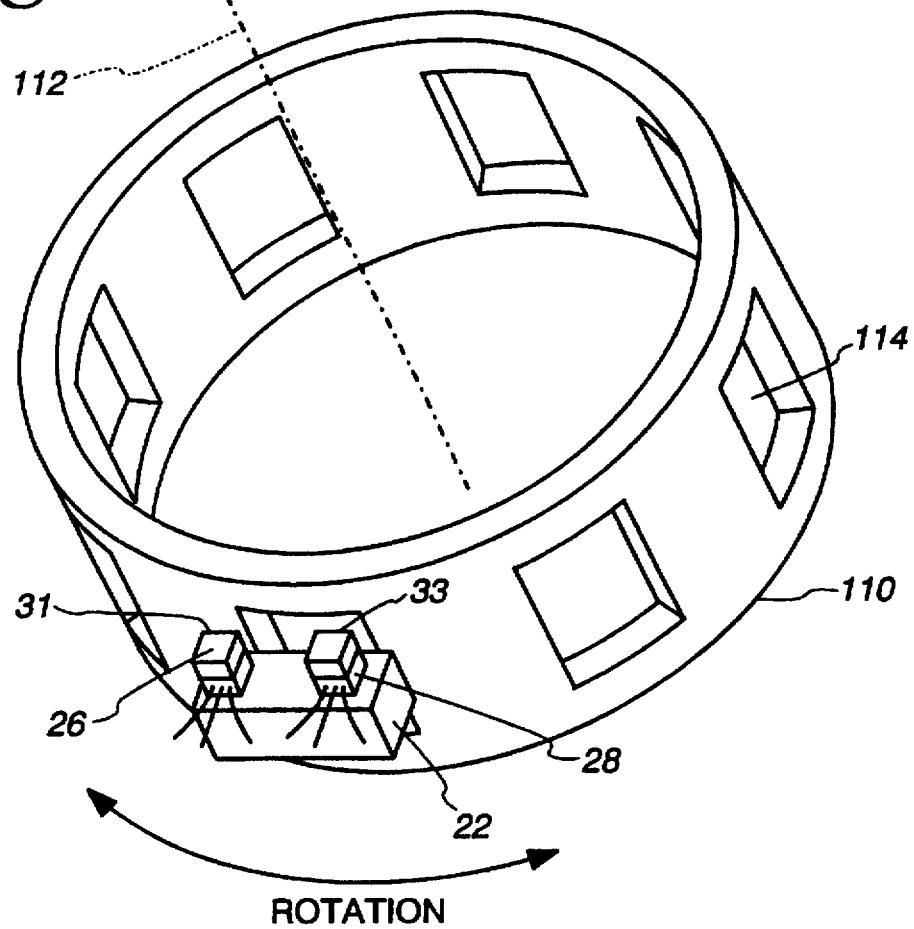
FIG. 10 is a perspective view of an alternative configuration of the dual element sensor assembly which illustrates the use of a single channel target wheel.
Figure 11:
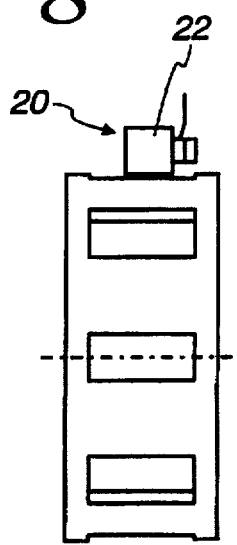
FIG. 11 is an end view of the dual element sensor and target wheel illustrated in FIG. 10.
Figure 12:
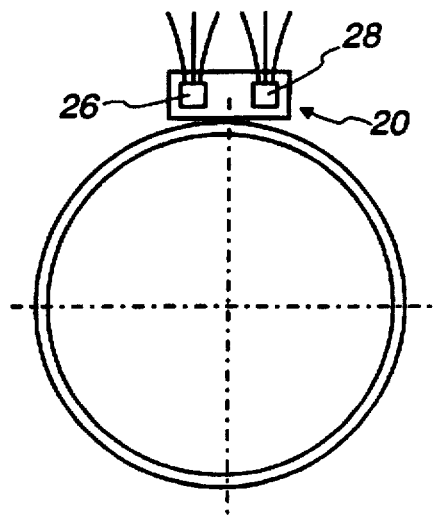
FIG. 12 is a plan view of the dual element sensor and target wheel illustrated in FIG. 10.

The dual element sensor assembly 20 is adapted to be with two different types ferrous target wheels. In particular, as shown in FIGS. 2, 4 and 5, the dual element sensor assembly 20 is adapted to be used with a dual channel ferrous target wheel with the dual element sensor assembly configured such that its longitudinal axis is generally parallel to the axis of rotation of the ferrous target wheel. Alternatively, as shown in FIGS. 10–12, the dual element sensor assembly 20 is utilized with a single channel ferrous target wheel and configured such that the longitudinal axis of the dual element sensor assembly 20 is generally perpendicular to the axis of rotation of the single channel ferrous target wheel.

Referring to FIG. 2, the sensor assembly 20 is adapted to be utilized with a dual channel ferrous target wheel 32 in which the targets, for example, 34 and 36, are axially separated, forming two channels to correspond and be aligned with the magnetic flux responsive elements 26 and 28, respectively. As will be discussed in more detail below, by providing a two-channel target wheel and angularly separating the targets 34 and 36 on the channels, the sensor assembly 20, in accordance with the present invention, in addition to being able to indicate the proximity of a ferrous target at zero speed on power-up, is additionally able to determine the direction of rotation of the ferrous target wheel 32.

As shown in FIG. 2, the sensor assembly 20 is disposed such that the magnetic neutral 24 of the bar magnet 22 is generally parallel to the axis of rotation 38 (FIGS. 4 and 5) of the ferrous target wheel 32. The sensor assembly 20 is also configured to be at a fixed air gap relative to the ferrous target wheel 32 as shown in FIGS. 2 and 4. The sensor assembly is also configured such that the magnetic flux responsive element 26 is aligned with the ferrous target 34 and other ferrous targets on one channel of the ferrous target wheel 32 while the magnetic flux responsive element 28 is aligned with the ferrous target 36 and any other ferrous targets on the other channel of the ferrous target wheel 32.

The angular location of the ferrous targets 34 and 36 on the ferrous target wheel 32 are axially spaced apart, as discussed above, forming two channels. In addition, the ferrous targets 34 and 36 are angularly offset from one another to provide a unique logic pattern for each direction of rotation of the ferrous target wheel 32. For example, the ferrous targets 34 and 36 may be angularly spaced apart to provide electrical pulses, as illustrated in FIG. 3, which are 90° out of phase with one another. In other words, the pulse train 40, for example, corresponding to channel A (i.e. the output signal from the magnetic flux responsive sensor 26), leads the pulse train 42 corresponding to channel B (i.e. the output signal from the magnetic flux responsive sensor 28) by 90 electrical degrees such that the pulse train 42 forms a quadrature signal. By utilizing the two channels, the quadrature signal defined by the pulse train 42 can provide an indication of the direction of rotation of the ferrous target wheel 32 by way of the unique logic sequence of the logical AND of the outputs of the magnetic flux responsive elements 26 and 28 at any given point along the ferrous target wheel 32. In particular, with reference to FIG. 3 for exemplary angular spacing of the ferrous targets, at 45°, for example, the output of channel A will be high while the output of channel B will be low. At 90°, the outputs of both channel A and channel B will be high, while at 135°, the output of channel A will be low while the output of channel B is high. At 180°, the outputs of both channel A and channel B will be low. The sequence is conveniently illustrated in Table 1.

TABLE 1

| ANGLE | 45° | 90° | 135° | 180° |
|---|---|---|---|---|
| OUTPUT CHANNEL A | 1 | 1 | 0 | 0 |
| OUTPUT CHANNEL B | 0 | 1 | 1 | 0 |
|  | A | A + B | B | 0 |

In the opposite direction, for example, starting at 225°, the output of channel A will be high while the output of channel B will be low. Next, at 180°, the outputs of both channel A and channel B will be low, while at 135°, the output of channel B will be high while the output of channel A is low. At 90° the outputs of both channel A and channel B will be high. The logic sequence for the opposite direction is summarized in Table 2. Thus, the logic sequence is able to provide an indication of the direction of rotation of the ferrous target wheel 32 based upon the unique logic sequences of the channel A and channel B outputs as discussed above.

TABLE 2

| ANGLE | 225° | 180° | 135° | 90° |
|---|---|---|---|---|
| OUTPUT CHANNEL A | 1 | 0 | 0 | 1 |
| OUTPUT CHANNEL B | 0 | 0 | 1 | 1 |
|  | A | 0 | B | A + B |

It is also contemplated that the target wheel 36 be configured with axially separated targets which are not angularly offset relative to one another. In such an application, the sensor 20 configured as shown in FIG. 2 would not be able to determine the direction of rotation of the ferrous target wheel 32 but would provide a redundant sensor system for certain application where the direction of rotation is not required.

The magnetic flux responsive elements 26 and 28 may be digital Hall effect elements such as a Sprague Model No. UGS 3134. However, other digital Hall effect elements are contemplated to be within the broad scope of the invention. It is only necessary that a digital output signal be provided in response to the presence or absence of a ferrous target, such as the ferrous targets 34, 36 on the ferrous target wheel 32. It is also contemplated that various signal conditioning circuitry may be utilized in certain applications. Such signal conditioning circuitry is well within the ordinary skill in the art. In addition to the Hall effect elements, it is also contemplated that other magnetic flux responsive elements may be used, such as a magneto-resistance element (MRE), magnetic variable resistor sensors (MRS), magnetic axial contact switches, and Reed switches are all considered to be within the scope of the present invention.

The magnet 22 is generally rectangularly configured and defines a magnetic neutral 24 between the North and South magnetic poles. Although the magnet 22 is illustrated as having a generally rectangular shape, it is contemplated that other configurations of the magnet are also within the broad scope of the invention.

The flux concentrators 31 and 33 are illustrated with a generally rectangular cross section. However, other configurations for the flux concentrators 31 and 33 are also contemplated, such as the barrel-shaped flux concentrators illustrated in U.S. Pat. No. 4,970,463.

As illustrated best in FIG. 1, a magnetic flux responsive element 26 and a flux concentrator 31 are rigidly secured together, for example, by way of an epoxy or other adhesive forming, for example, a channel A sensor sub-assembly 44. Similarly, the magnetic flux responsive element 28 and the flux concentrator 33 are rigidly connected together, forming a channel B sensor sub-assembly 46. The channel A and channel B sensor sub-assemblies 44 and 46 are spaced apart a predetermined distance D (FIG. 1) to correspond to the channels on the ferrous target wheel 32. In order to adjust the sensitivity of each of the sensor sub-assemblies 44 and 46, respectively, the sensor sub-assemblies 44 and 46 are moved about their respective magnetic axes (i.e., axes generally perpendicular to the magnetic neutral 24 between the opposing North and South poles). Once the assemblies 44 and 46 are adjusted, the assemblies 44 and 46 are rigidly secured with respect to the lateral face 30 of the magnet 22 with a suitable epoxy or adhesive, as discussed in the '463 patent and potted with a suitable potting material.

Figure 6:
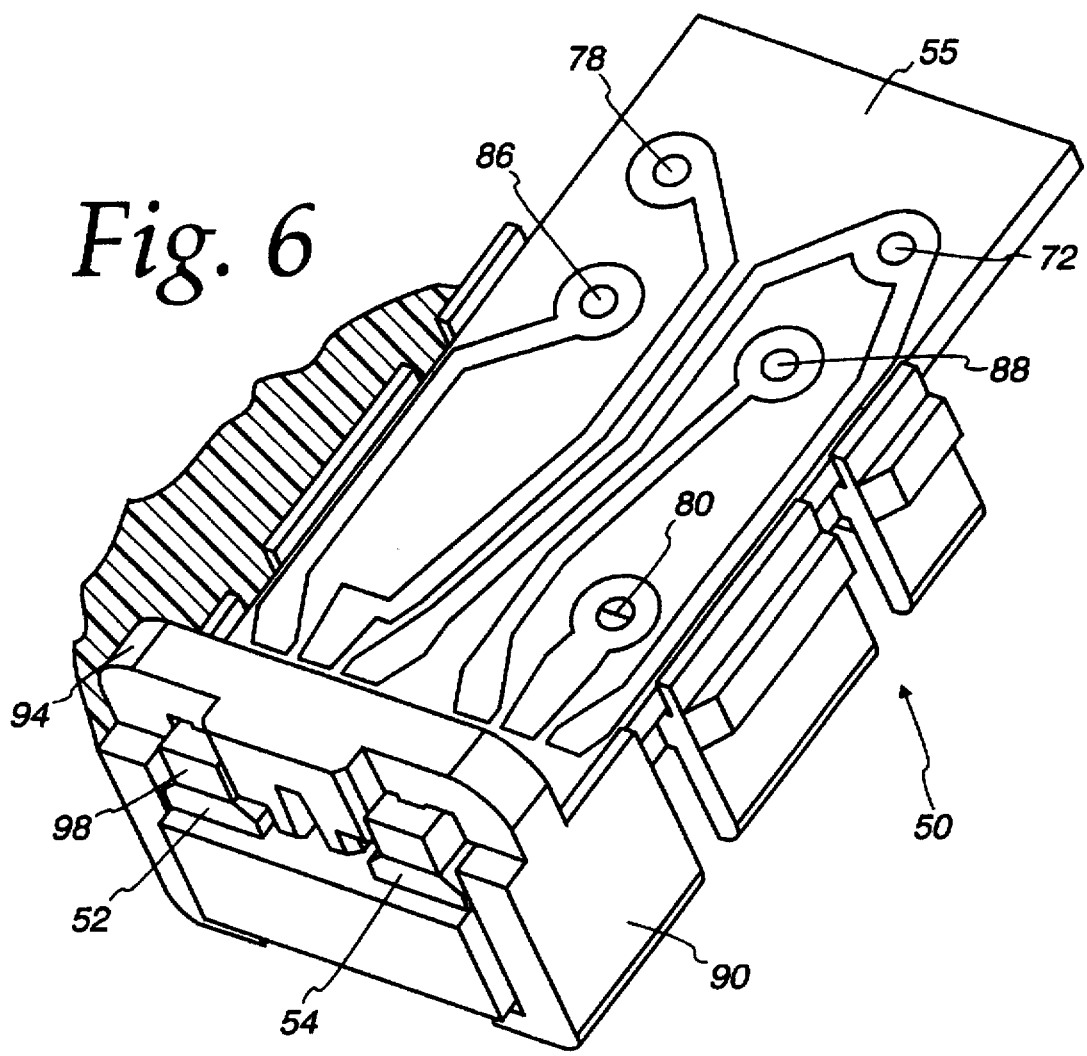
FIG. 6 is a perspective view of an alternative embodiment of the dual-element sensor according to the present invention.
Figure 7:
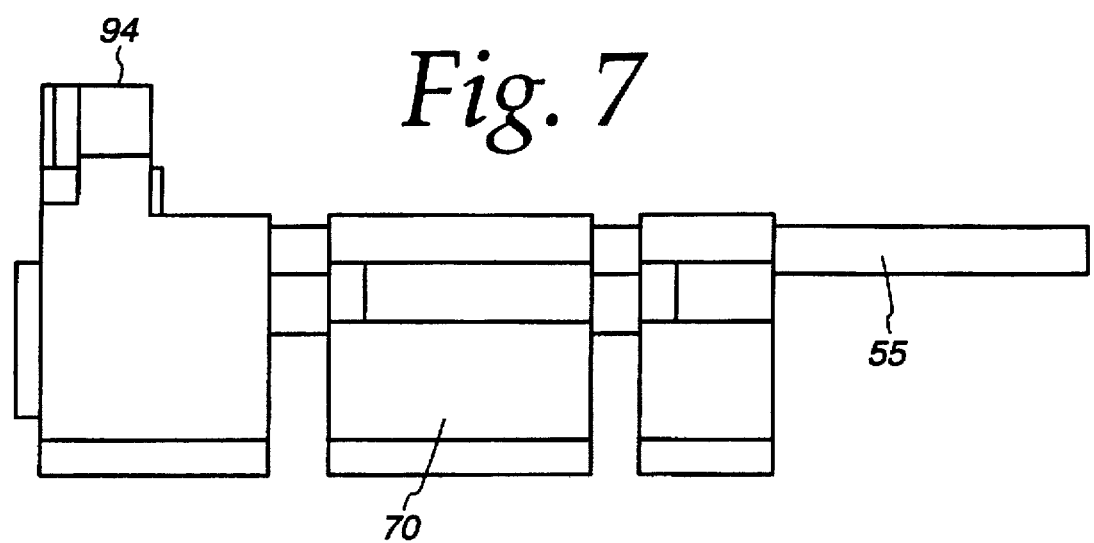
FIG. 7 is a side elevational view of the embodiment illustrated in FIG. 6.
Figure 8:
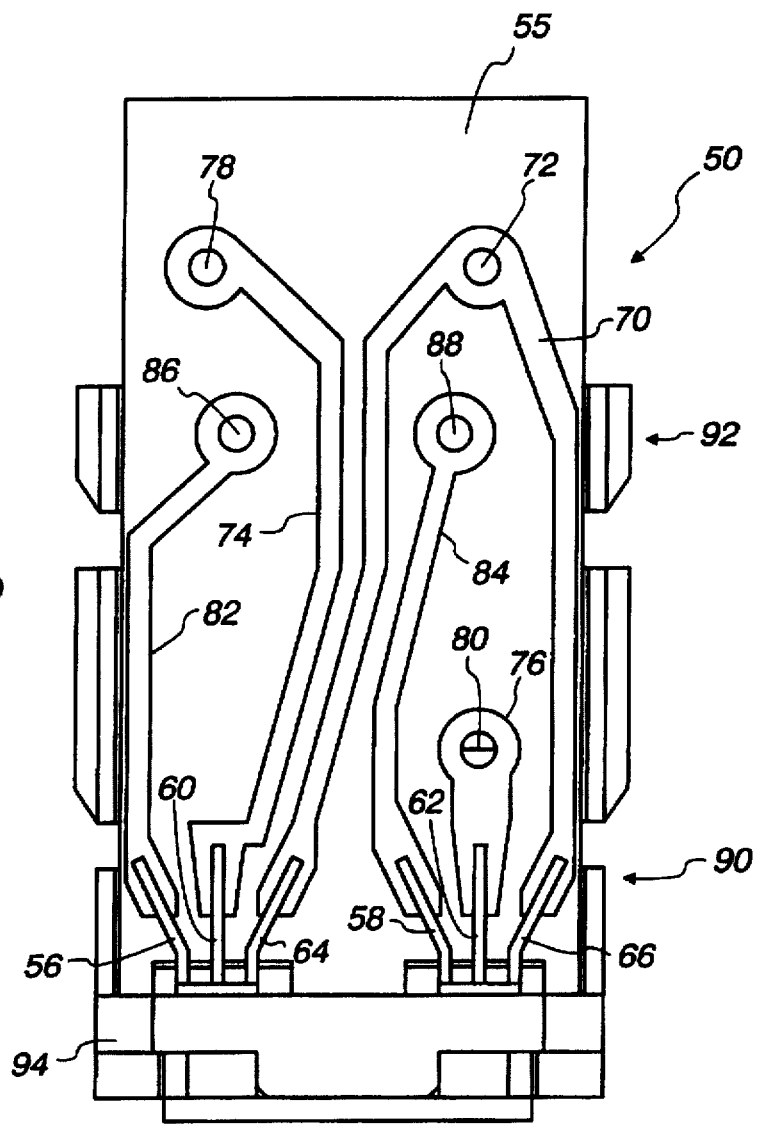
FIG. 8 is a plan view of the embodiment illustrated in FIG. 6.
Figure 9:
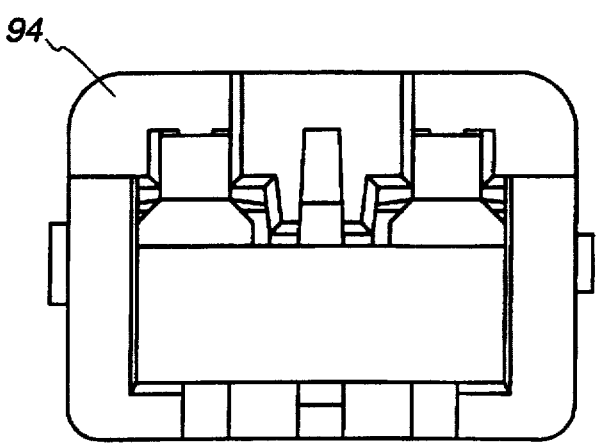
FIG. 9 is an end elevational view of the embodiment illustrated in FIG. 6.

One embodiment of a sensor assembly incorporating the principles of the present invention is illustrated in FIGS. 6–9. The embodiment illustrated in FIGS. 6–9 shows an alternative configuration for adjusting the magnetic flux sensor sub-assemblies 44 and 46 relative to the magnet 22. As best shown in FIG. 6, the sensor assembly, generally identified with the reference numeral 50, includes a pair of digital Hall effect elements 52 and 54, rigidly secured to a printed circuit board 55. As best shown in FIG. 8, the Hall effect elements 52 and 54 are each three terminal devices, which have output pins, identified with the reference numerals 56 and 58, respectively, ground pins 60 and 62, respectively, and B$^+$ supply pins 64 and 66, respectively. The printed circuit board 55 is formed with a number of conductive traces, generally identified with the reference numeral 68, to enable the sensor assembly 50 to be connected to an external circuit. In particular, a conductive trace 70 is connected between the B$^+$ supply terminals 64 and 66 of the Hall effect elements 52 and 54, respectively, and, in turn, is connected to a common output terminal 72. The ground pins 60 and 62 of the Hall effect elements 52 and 54 are electrically connected to conductive traces 74 and 76, respectively, and, in turn, to output terminals 78 and 80, respectively. The output pins 56 and 58 of the Hall effect elements 52 and 54 are connected to conductive traces 82 and 84 and, in turn, to output terminals 86 and 88, respectively.

The printed circuit board 55 is carried by a carrier 90 formed from a non-magnetically conducted material, such as plastic. The carrier 90 includes a number of guide portions 92 for carrying the printed circuit board 55. At one end of the carrier 90 is an arched portion 94 (shown best in FIG. 6), which enables the Hall effect devices 52 and 54 to be positioned relative to a magnet 96 and flux concentrators 98 and 100.

In the configuration illustrated in FIGS. 6–9, it is contemplated that the magnet 96 and the Hall effect elements 52 and 54 are fixed. In such configuration, the flux concentrators 98 and 100 are moved about an axis generally parallel to the longitudinal axis of the printed circuit board 55. In other configurations, it is contemplated that the Hall effect elements 52 and 54 and corresponding flux concentrators 98 and 100 are fixed, while the magnet 96 is moved along an axis generally parallel to the longitudinal axis of the printed circuit board 55. In yet other configurations, it is contemplated that the Hall effect devices 52 and 54 and corresponding flux concentrators 98 and 100 are rigidly fixed relatively to each other and movable relative to the magnet 96. In such a configuration, it is contemplated that the Hall effect elements 52 and 54 and corresponding flux concentrators 98 and 100 are attached to a separate printed circuit board (not shown) that is in sliding contact with the printed circuit board 55. All of the configurations are within the broad scope of the invention.

In arriving at the invention, two sensor assemblies, built as disclosed in U.S. Pat. No. 4,970,463, were utilized with a single channel target wheel 110, as illustrated in FIGS. 10–12. More particularly, two sensor assemblies each formed from a magnetic flux responsive element, a magnet and a flux concentrator were disposed such that the sensor assemblies were aligned about an axis generally perpendicular to an axis 112 of rotation of the ferrous target wheel 110 such that the sensor assemblies were sequentially exposed to the targets as shown best in FIG. 10. With such a configuration, due to the magnetic coupling between the two separate magnets, the assemblies could not be adjusted to provide acceptable and reliable output signals. The sensor assembly 20, as illustrated in FIG. 1, solves this problem by eliminating the magnetic coupling between the separate magnets by configuring the sensor assembly 20 such that the magnetic flux responsive elements 26 and 28 are disposed on a common magnet 22. By disposing the magnetic flux responsive elements 26 and 28 on a common magnet 22, the sensor assembly 20 is able to detect the proximity of the ferrous target wheel 32 as well as the direction of rotation of the ferrous target wheel 32.

As mentioned above, the dual element sensor assembly 20 is also adapted to be utilized with a single channel target wheel 110, formed with a plurality of angularly spaced targets 114, as shown best in FIG. 10. In this embodiment, the dual element sensor assembly 20 is configured such that its longitudinal axis is generally perpendicular to the axis of rotation of the ferrous target wheel 110. However, in this configuration, the spacing D (FIG. 1) between the channel A and channel B subassemblies 44 and 46 are spaced to set up the electrical degrees separation of the output signals of the subassemblies 44 and 46. The targets 114 are angularly spaced to avoid any overlapping of the output signals. As in the case of the configuration illustrated in FIGS. 2, 3 and 4, the configuration illustrated in FIGS. 10–12 is able to indicate the proximity of a ferrous target at zero speed on power-up as well as determine the direction of rotation of the ferrous target wheel 110.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A proximity sensor assembly for sensing ferrous targets disposed on a ferrous target wheel, adapted to rotate about a predetermined axis of rotation, the proximity sensor assembly comprising;

first detecting means for detecting the proximity of a ferrous target relative to the sensor assembly; and second detecting means for detecting the direction of rotation of ferrous targets on the ferrous target wheel when said ferrous target wheel is rotating about said axis of rotation, wherein said first and second detecting means are secured to a single magnet having a opposing North and South magnetic poles defining a magnetic axis therebetween, said magnet disposed such that said magnetic axis is generally perpendicular to said axis of rotation.

2. A proximity sensor assembly as recited in claim 1, wherein said first detecting means includes means for detecting the proximity of a ferrous target that is at rest.

3. A proximity sensor assembly as recited in claim 1, wherein said first detecting means includes a predetermined first magnetic flux responsive element.

4. A proximity sensor assembly as recited in claim 3, wherein said first detecting means further includes a first predetermined flux concentrator.

5. A proximity sensor assembly as recited in claim 4 wherein said first predetermined flux concentrator is rigidly secured relative to said first magnetic flux responsive element.

6. A proximity sensor assembly as recited in claim 3, wherein said first predetermined flux responsive element is a Hall effect element.

7. A proximity sensor assembly as recited in claim 1, wherein said second detecting means includes a second predetermined magnetic flux responsive element.

8. A proximity sensor assembly as recited in claim 7, wherein said second detecting means further includes a second predetermined flux concentrator.

9. A proximity sensor assembly as recited in claim 8, wherein said second predetermined flux concentrator is rigidly secured relative to said second magnetic flux responsive element.

10. A proximity sensor assembly as recited in claim 7, wherein said second magnetic flux responsive element is a Hall effect element.

11. A proximity sensor for sensing ferrous targets disposed on a ferrous target wheel, adapted to rotate about a predetermined axis of rotation, the proximity sensor assembly comprising;

a single magnet having opposing North and South magnetic pole faces defining a magnetic neutral plane therebetween along a lateral face and further defining a magnetic axis between said opposing North and South magnetic poles faces, said magnetic axis disposed to be generally perpendicular to said axis of rotation;

a first predetermined magnetic flux responsive element rigidly secured to said magnet between said opposing North and South pole faces; and a second predetermined magnetic flux responsive element rigidly secured to said magnet between said opposing North and South pole faces forming the sensor assembly, said sensor assembly having a longitudinal axis;

wherein said proximity sensor is adapted to produce signals indicative of the speed of the ferrous target as well as the direction of rotation of the ferrous target.

12. A proximity sensor assembly as recited in claim 11, further including a first predetermined flux concentrator.

13. A proximity sensor assembly as recited in claim 12, wherein said first predetermined flux concentrator is generally rectangular in cross-section.

14. A proximity sensor assembly as recited in claim 12, wherein said first predetermined flux concentrator is rigidly secured to said first magnetic flux responsive element.

15. A proximity sensor assembly as recited in claim 12, further including a second predetermined flux concentrator.

16. A proximity sensor assembly as recited in claim 15 wherein said second predetermined flux concentrator is generally rectangular in cross-section.

17. A proximity sensor assembly as recited in claim 15, wherein said second predetermined flux concentrator is rigidly secured relative to said first magnetic flux responsive element.

18. A proximity sensor assembly as recited in claim 11, wherein said first magnetic flux responsive element is a Hall effect element.

19. A proximity sensor assembly as recited in claim 18, wherein said second magnetic flux responsive element is a Hall effect element.

20. A proximity sensor assembly as recited in claim 11, wherein said magnetic neutral plane is generally parallel to said axis of rotation of said ferrous target wheel.

21. A proximity sensor assembly as recited in claim 11, wherein said sensor assembly is configured such that said longitudinal axis is generally parallel to the axis of rotation of said ferrous target wheel.

22. A proximity sensor assembly as recited in claim 11, wherein said sensor assembly is configured such that said longitudinal axis is generally perpendicular to the axis of rotation of said ferrous target wheel.

23. A proximity sensor system comprising;

a ferrous target wheel adapted to rotate about a predetermined axis of rotation, said ferrous target wheel formed with ferrous targets axially spaced apart defining a first channel and a second channel, said targets also configured such that said ferrous targets forming said first channel are angularly spaced apart relative to said ferrous targets forming said second channel;

a magnet having opposing North and South magnetic pole faces defining a neutral plane therebetween and further defining a magnetic axis therebetween, said magnet being disposed such that said magnetic axis is generally perpendicular to said axis of rotation;

first detecting means for detecting ferrous targets forming said first channel; and second detecting means for detecting the ferrous targets forming said second channel;

wherein said proximity sensor is adapted to produce signals representative of the direction of rotation of said ferrous target wheel.

24. A proximity sensor as recited in claim 23, further including means for detecting the rotation of said ferrous target wheel.

25. A proximity sensor as recited in claim 23, wherein said first detecting means includes means for sensing the proximity of ferrous targets forming said first channel when said ferrous target wheel is at rest.

26. A proximity sensor as recited in claim 23, wherein said second detecting means includes means for sensing the proximity of ferrous targets forming said second channel when said ferrous target wheel is at rest.

27. A proximity sensor system as recited in claim 23, wherein said first detecting means includes a first predetermined magnetic flux responsive element.

28. A proximity sensor system as recited in claim 27, wherein said first detecting means includes a first flux concentrator rigidly secured relative to said first predetermined magnetic flux responsive element forming a first sub-assembly.

29. A proximity sensor system as recited in claim 27, wherein said second detecting means includes a second flux concentrator rigidly secured relative to said second predetermined magnetic flux responsive element forming a second sub-assembly.

30. A proximity sensor system as recited in claim 28, wherein said first sub-assembly is rigidly secured to said magnet between said opposing North and South magnetic pole faces.

31. A proximity sensor system as recited in claim 30, wherein said second sub-assembly is rigidly secured to said magnet between said opposing North and South magnetic pole faces.

32. A proximity sensor system as recited in claim 23, wherein said magnetic neutral plane is generally parallel to said predetermined axis of rotation of said ferrous target wheel.

33. A proximity sensor system as recited in claim 27, wherein said first predetermined magnetic flux responsive element is a Hall effect element.

34. A proximity sensor system as recited in claim 28, wherein said second predetermined magnetic flux responsive element is a Hall effect element.

35. A proximity sensor system comprising:
- a ferrous target wheel adapted to rotate about a predetermined axis of rotation, said ferrous target wheel formed with a plurality of ferrous targets;
- a magnet having opposing North and South magnetic poles faces defining a neutral plane therebetween and further defining a magnetic axis between said opposing pole faces, said magnet being disposed such that said magnetic axis is generally perpendicular to said axis of rotation;
- first detecting means for detecting said ferrous targets; and
- second detecting means for detecting said ferrous targets;
- wherein said proximity sensor system is adapted to provide signals indicative of the direction of rotation of said ferrous target wheel.

* * * * *

UNITED STATES PATENT AND TRADEMARK OFFICE
CERTIFICATE OF CORRECTION

PATENT NO. : 5,719,496
DATED : February 17, 1998
INVENTOR(S) : Wolf et al.

It is certified that error appears in the above-indentified patent and that said Letters Patent is hereby corrected as shown below:

```
Column 7, line 50, change "poles" to --pole--.
Column 10, line 9, change "poles" to --pole--.
```

Signed and Sealed this

Fifth Day of May, 1998

*Attest:*

BRUCE LEHMAN

*Attesting Officer*     *Commissioner of Patents and Trademarks*